April 21, 1936.                C. M. KRETCHMER                2,038,366
LICORICE PIPE CONFECTION AND METHOD OF MAKING THE SAME
Filed June 2, 1934

INVENTOR:-
C. M. KRETCHMER
BY
ATTORNEYS.

Patented Apr. 21, 1936

2,038,366

UNITED STATES PATENT OFFICE 2,038,366

LICORICE PIPE CONFECTION AND METHOD OF MAKING THE SAME

Clarence M. Kretchmer, San Francisco, Calif., assignor to American Licorice Co., San Francisco, Calif., a corporation of Illinois Application June 2, 1934, Serial No. 728,769

2 Claims. (Cl. 99—138)

This invention relates to improvements in confections and the method of making the same, and has particular reference to a method of making a licorice pipe that includes a hollow bowl and stem, as compared to this type of confection wherein the conventional solid bowl and stem is manufactured and sold in the trade.

The principal object is to employ a method that is unique and simple in practice and which will produce an economically constructed and attractively designed pipe that possesses the above mentioned characteristics.

Other objects and advantages will be apparent during the course of the following description.

Figure 1:
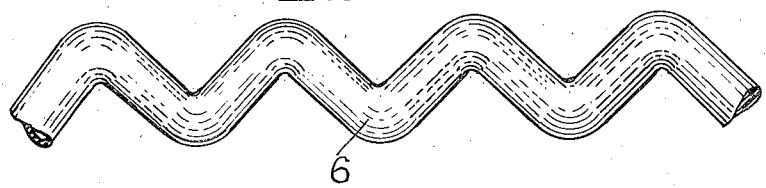
Figure 2:
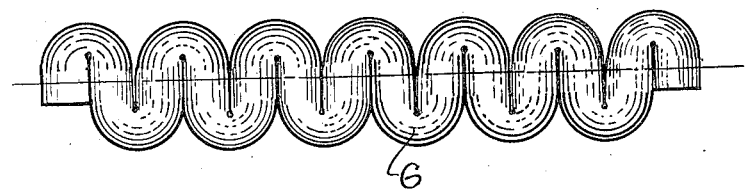
Figure 3:
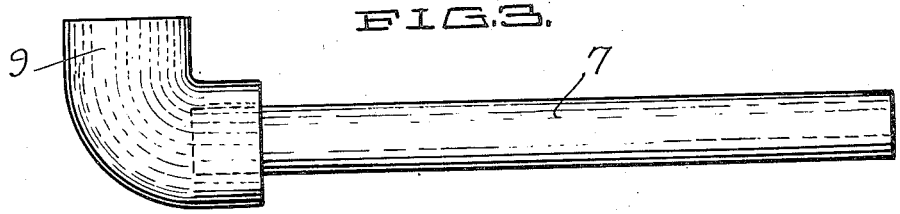
Figure 4:
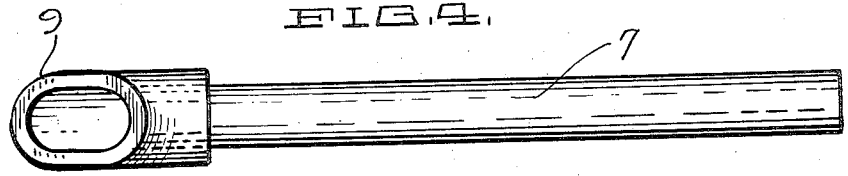
Figure 5:

In the accompanying drawing forming a part of this specification and in which like numerals are employed to designate like parts throughout the same, Fig. 1 is a front elevation on a small scale of the licorice stock from which the bowl portion of the pipe is formed, Fig. 2 is a similar view illustrating the method of compressing the stock prior to severing the same, Fig. 3 is a side elevation on an enlarged scale, showing the finished pipe, Fig. 4 is a top plan view of the pipe illustrated in Fig. 3, and Fig. 5 is a cross section through the bowl portion with the stem being shown in elevation.

It is well known that imitation smoker's pipes in candy form have long been introduced to the trade and the same have found favor with children because of their desire to imitate elders in the act of smoking. These pipes are manufactured in various forms of confections, including licorice, but to my knowledge the latter type are of a solid form. To, therefore, introduce to the trade, a novel confection wherein a hollow bowl and stem are utilized and whereby the pipe will simulate in certain details of construction, a conventional smoker's pipe, I have devised the present pipe confection and in the manufacture of the same have resorted to a novel, economical, effective and quick method of manufacture.

In the accompanying drawing wherein for the purpose of illustration is shown a preferred embodiment of my invention, the numeral 6 designates the stock of material from which the bowl is formed and as disclosed to advantage in Fig. 1, it will be noted that the said stock is of tubular form. The numeral 7 designates the stem portion of the pipe, which is likewise tubular and is adapted to be adhesively secured by gum arabic or a similar binding agent 8 to the bowl portion 9.

The method resorted to in the manufacture or formation of the pipe may be briefly described as follows:—

I first produce a tubular stock of licorice as illustrated in Fig. 1 and thereafter compress the stock so that it assumes the form illustrated in Fig. 2. A suitable severing implement is then drawn longitudinally over the compressed mass from the left to the right of the drawing, thus effecting a severing of the same to obtain a plurality of bowl portions, one of which is shown to advantage in Figs. 3, 4 and 5. It will be readily understood that the natural elasticity of the licorice will permit the referred to compression and the subsequent expansion or stretching to effect the configuration realized and illustrated to advantage in the last mentioned figures of the drawing. From an elongated section of tubular licorice I make a plurality of stem portions by severing the section at predetermined points to thus obtain stem portions of substantially the dimensions illustrated in the drawing. One end of the stem portion is then inserted in the lower end of the bowl section and adhesively secured thereto by a suitable binding agent. Gum arabic is preferable because of its positive adhesive qualities and the further fact that it is non-injurious and yet palatable when the child wishes to eat the licorice pipe.

From a consideration of the description set forth, it will be obvious that I have devised a novel candy pipe that due to the hollow formation of the bowl and pipe sections, will afford amusement to the children in simulating the action of an elder in drawing on the pipe, and is unique in the method utilized to obtain the finished pipe confection.

It is to be understood that the form of my invention herewith shown and described is to be taken as a preferred example of the same and that changes in the shape, size and material and the steps resorted to in the method of making the confection may be readily made, without departing from the principle of the invention or the scope of the subjoined claims.

Having thus described my invention, I claim:—

1. The method of producing an imitation smoking pipe which consists in forming a tubular stock of resilient edible material into continuous wavy sections, simultaneously severing the sections to produce a plurality of pipe bowl sections of elbow configuration, and finally inserting straight tubular stem sections therein of the same edible material and cementing the stem sections and bowl sections together.

2. The method of producing an imitation smoking pipe which consists in forming a tubular stock of resilient edible material into continuous wavy sections, severing the sections to produce a plurality of pipe bowl sections of elbow configuration, and finally inserting in the pipe bowl sections tubular stem sections of edible material and cementing the stem sections and bowl sections together.

CLARENCE M. KRETCHMER.